W. H. STOCKWELL.
AUTOMOBILE TOWING ATTACHMENT.
APPLICATION FILED JUNE 12, 1913.
1,106,746.
Patented Aug. 11, 1914.
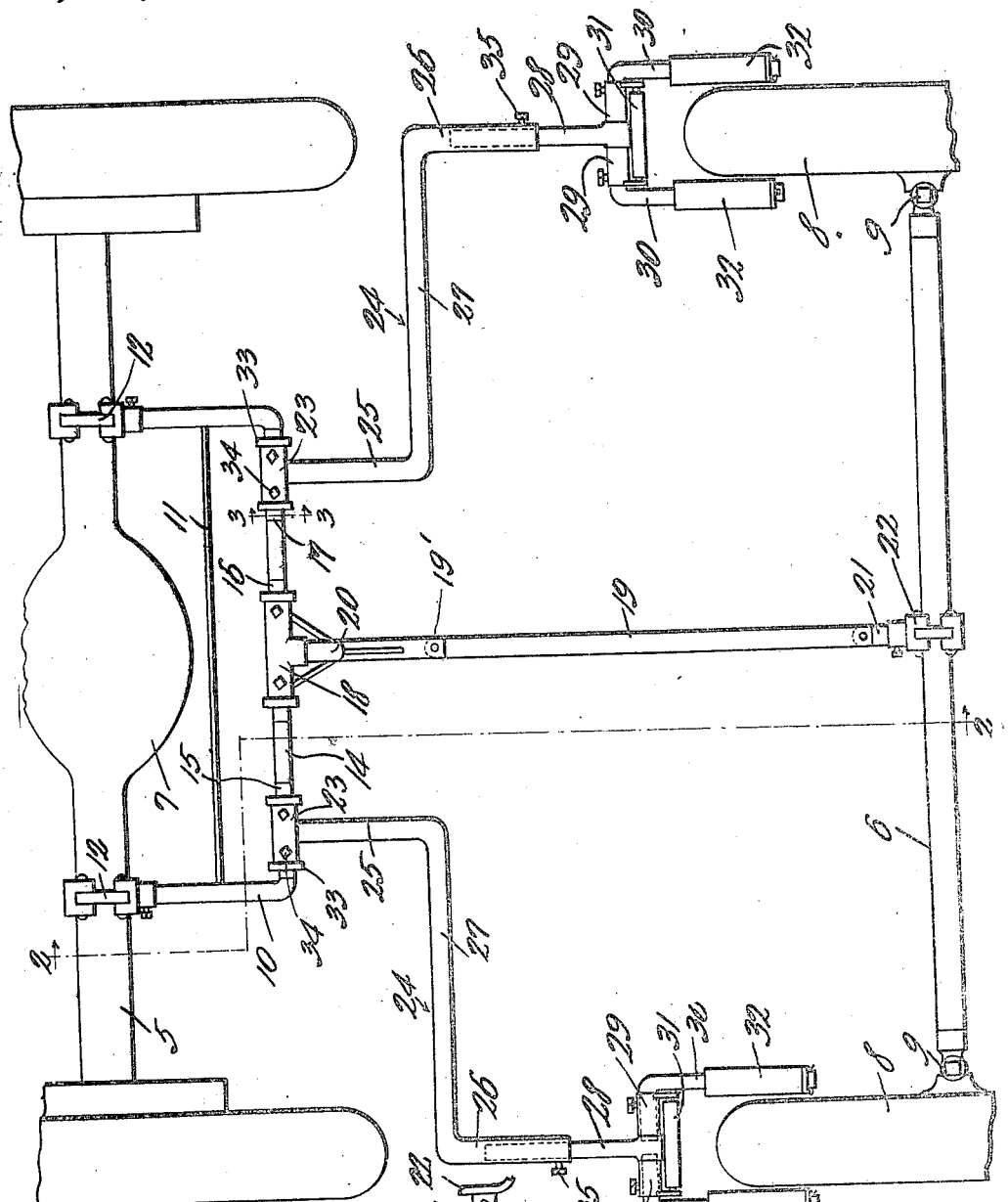
William H. Stockwell
Inventor

UNITED STATES PATENT OFFICE.

WILLIAM H. STOCKWELL, OF SHREVEPORT, LOUISIANA.

AUTOMOBILE TOWING ATTACHMENT.

1,106,746.

Specification of Letters Patent. Patented Aug. 11, 1914.

Application filed June 12, 1913. Serial No. 773,270.

*To all whom it may concern:*

Be it known that I, WILLIAM H. STOCKWELL, a citizen of the United States, residing at Shreveport, in the parish of Caddo and State of Louisiana, have invented a new and useful Automobile Towing Attachment, of which the following is a specification.

This invention relates to a towing attachment for automobiles.

An object of the present invention is to provide a towing attachment for automobiles whereby the machine towed and the towing one will be held and maintained in spaced relation.

A further object is to provide a towing attachment secured to the rear axle of the towing machine and engaging the front axle of the towed machine whereby the two cars will be held in spaced relation, and the front wheels of the towed machine turned to correspond with the angular position of the rear axle of the towing machine.

A further object is to provide a device in which the various parts thereof are detachable so that the same will occupy little space during the non-use thereof.

With the foregoing and other objects in view, which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferable form of my invention is illustrated in which:—

Figure 1 is a diagrammatic view of my improved device, illustrating the same as connected to the rear axle of the towing machine and the front axle of the towed machine. Fig. 2 is a cross sectional view taken on the line 2—2 of Fig. 1. Fig. 3 is a cross sectional view taken on the line 3—3 of Fig. 1. Fig. 4 is a view in perspective of one of the locking rings.

Referring to the drawings in which similar reference numerals designate corresponding parts throughout the several views, 5 is the rear axle of an automobile or vehicle and 6 is the front axle of a similar vehicle. The axle 5 represents the rear axle of a towing vehicle and includes the differential casing 7. The front wheels 8 of the towed vehicle are mounted to swing about the steering knuckles 9 as is the general practice in automobile constructions.

A U-shaped bar 10 is provided with a brace 11 and with the extremities thereof provided with the clamps 12. The clamps 12 are provided with the thumb screw 13 whereby they may be securely locked upon the rear axle 5 at opposite sides of the differential casing 7. The body portion 14 of the bar 10 has the three squared portions 15, 16 and 17 milled or cut thereon. A rectangular sleeve 18 has one of the side walls thereof removed and detachable fits upon the squared portion 16 of the bar 10. Connected to the sleeve 18 is the tie rod 19 which due to the crook 20 therein lies below the plane of the body portion 14, the crook or offsetting in question allowing for the drop in the front axle of automobiles. To the rear extremity of the tie rod 19 is pivotally secured a short bar 21 to which is detachably secured the clamp 22, the clamp 22 engaging the front axle 6 of the towed machine. Mention is made of a second pivotal joint 19' located adjacent the front portion of the tie rod 19 which with the loose fitting manner in which the wheels engage the turning arms allows a sufficient play of the various parts during the rounding of a corner as it is thought will be readily appreciated.

Detachably secured to the squared portions 15 and 17 are the rectangular sleeves 23 connected with which are the arms generally designated as 24 and which includes the longitudinal portions 25 and 26 connected by or formed integral with the transverse portion 27. Slidably mounted with the portion 26 is the bar 28 the latter being provided with outwardly projecting sleeve 29 into which are adjustably and detachably secured the forks. A roller 31 is secured to each pair of outstanding sleeves 29 and is adapted to contact with the tires of the wheels to thereby largely reduce the friction between the steering arms 24 and the tires. Also the fork members 30 are provided with similar rollers 32 which contact with the sides of the vehicle tires and are adapted to turn or swing the wheels by exerting a suitable force thereupon. The adjustable manner in which the forks 30 are secured to the outstanding sleeves 29 allows the device herein described to be used with vehicles having tires of varying widths.

As illustrated in Fig. 4, square collars 33 are provided and fit over the rectangular sleeves 18 and 23 contacting with the inner surface of the squared portion of the rod 10 to thereby secure the said rectangular sleeves to the squared portions. In order to prevent the accidental displacement of the sleeves from the squared portions, suitable set screws or other holding means 34 are provided extending through the sleeves to thereby force the sleeve and squared portion apart with the result that a suitable binding action will be obtained between the sleeve, the square and the square collar 33 as will be readily appreciated. In this manner the various parts may be readily taken apart when the device is not in use and will occupy little or no space.

When it is desired to tow an automobile or vehicle, heretofore a rope or chain has been used. However, this required an operator in the towed car and it required no little skill to prevent the two cars from running into each other. Also considerable difficulty was experienced in the snapping or breaking of the rope due to the sudden starting or stopping of either of the cars. With the device as hereindescribed, all of these disadvantages are done away with and a rigid tie rod extends between the rear axle of the towing vehicle and the front axle of the towed vehicle whereby the two machines are always held in proper spaced relation, the tie rod taking up and successfully transmitting compressive as well as tensional stresses. Furthermore in order that the towed vehicle will follow accurately the path of the towing vehicle and to do away with the necessity of an additional operator in the towed car, the steering arms 24 are provided and by reason of the rollers 32 contacting with the front wheels of the towed vehicle any change in angle of the respective rear and front axles of the two vehicles will result in a corresponding turning or swinging of the front wheels 8 of the towed vehicle so that the front and rear axles of the respective vehicles will again be brought into parallelism. Thus the towed vehicle will quickly respond to the turning movement of the towing vehicle. The bar 28 is slidably secured within the sleeve-like portion 26 of the arm 24 and may be locked in any desired position by reason of the set screws 35.

What I claim is:—

1. The combination with a towing vehicle, and a towed vehicle, of a structure extending between and secured to the said vehicles, and means carried by said structure engaging the front wheels of the towed vehicle adapted to steer the same.

2. The combination with a towing vehicle, and a towed vehicle, of means extending therebetween for holding the vehicles in spaced relation, and means carried by the said means engaging the front wheels of the towed vehicle for a steering thereof.

3. A towing attachment for vehicles comprising a rigid structure, means carried thereby for securing it to a towing vehicle, means carried thereby for securing it to a towed vehicle, and means carried thereby engaging the front wheels of the towed vehicle adapted to steer the same.

4. A vehicle towing attachment comprising a rigid structure, means for pivotally securing the same to the towing vehicle, means for securing the said rigid structure to the towed vehicle, means carried by the said rigid structure engaging the front wheels of the towed vehicle adapted to turn the same for a steering thereof.

5. In a device of the class described, the combination of a rigid structure, means for detachably securing the same to the rear axle of a vehicle, means for securing the opposite end thereof to the front axle of a second vehicle, and means extending therefrom engaging the front wheels of the second mentioned vehicle and adapted to swing the same to thereby maintain the said axles in parallelism.

6. In a mechanism of the class described the combination of a rigid structure, means secured thereto adapted to detachably engage the rear axle of a vehicle, means secured to the opposite end of said rigid structure adapted to detachably and pivotally engage the front axle of a second vehicle, and arms projecting from said rigid structure engaging the front wheels of the second mentioned vehicle and adapted to swing the same for the steering of the second mentioned vehicle.

7. In a device of the class described, the combination of a U-shaped bar, clamps secured to the extremities thereof adapted to detachably engage the rear axle of a towing vehicle, a tie rod detachably engaging the said U-shaped member and extending rearwardly therefrom, a clamp secured to the free end of said tie rod and adapted to detachably engage the central portion of the front axle of a towed vehicle, arms detachably secured to said U-shaped member and projecting therefrom, forked members with rollers adapted to frictionally engage the front wheels of the towed vehicle and adapted to swing the same for the steering thereof.

8. A towing attachment comprising a rigid structure, means for securing the same to a towing vehicle, means carried by the rigid structure for pivotally securing the same to the towed vehicle, and means carried by the rigid structure engaging one of the front wheels of the towed vehicle adapted to turn the same for a steering thereof.

9. A towing device comprising a rigid structure, means for pivotally securing the same to a towing vehicle, means for pivotally securing the same to a towed vehicle, and means carried by the rigid structure engaging a front wheel of the towed vehicle for a steering thereof.

10. A device of the class described comprising a rigid structure, means for securing the same to the rear axle of a towing vehicle, means for securing the rigid structure to the front axle of a towed vehicle, and means carried by the rigid structure engaging a front wheel of the towed vehicle to mechanically steer the towed vehicle by the towing vehicle.

11. A device of the class described comprising a rigid structure, means engaging the rear axle of a towing vehicle at spaced points and engaging the said rigid structure, means carried by the rigid structure for engaging the towed vehicle for a towing thereof, and means carried by the rigid structure engaging the front wheel of the towed vehicle for steering the same by the towing vehicle.

In testimony that I claim the foregoing as my own, I have hereto affixed my signature in the presence of two witnesses.

WILLIAM H. STOCKWELL.

Witnesses:
  L. M. Moffitt,
  E. F. Savage.